United States Patent [19]

Ewen et al.

[11] Patent Number: 5,519,100
[45] Date of Patent: May 21, 1996

[54] ADDITION OF ALUMINUM ALKYL FOR IMPROVED METALLOCENE CATALYST

[75] Inventors: John A. Ewen, Houston, Tex.; Michael J. Elder, Raleigh, N.C.

[73] Assignee: Fina Technology, Inc., Dallas, Tex.

[21] Appl. No.: 830,812

[22] Filed: Feb. 4, 1992

Related U.S. Application Data

[63] Continuation-in-part of Ser. No. 419,222, Oct. 30, 1989, abandoned.

[51] Int. Cl.$^6$ .............................. C08F 4/643; C08F 4/642
[52] U.S. Cl. ..................... 526/134; 526/128; 526/131; 526/132; 526/133
[58] Field of Search .................................. 526/131, 132, 526/133, 134, 128

[56] References Cited

U.S. PATENT DOCUMENTS

| | | | |
|---|---|---|---|
| 3,242,099 | 3/1966 | Manyik et al. | 502/117 |
| 3,756,998 | 9/1973 | Karapinka | 526/130 |
| 4,808,561 | 2/1989 | Welborn, Jr. | 502/104 |
| 5,241,025 | 8/1993 | Hlatky et al. | 526/129 |

FOREIGN PATENT DOCUMENTS

| | | |
|---|---|---|
| 0277004 | 8/1988 | European Pat. Off. . |
| 0277003 | 8/1988 | European Pat. Off. . |
| 0426637 | 5/1991 | European Pat. Off. . |

OTHER PUBLICATIONS

"Multiple Metal–Carbon Bonds", R. R. Schrock, P. R. Sharp, J. Am. Chem. Soc., pp. 2389–2399, vol. 100, No. 8 (Apr. 2, 1978).

"Cationic Alkylbis(cyclopentadienyl)titanium Complexes", M. Bochmann, L. Wilson, Organometallics, pp. 2556–2563, vol. 6, (1987).

Insertion Reactions of Nitriles in Cationic Alkylbis(cyclopentadienyl)titanium Complexes, M. Bochmann, L. Wilson, organometallics, pp. 1147–1154, vol. 7 (1987).

"Ethylene Polymerization by a Cationic Dicyclopentadienylzirconium(IV) Alkyl Complex", R. F. Jordan, C. S. Bajgur, R. Willett, B. Scott, J. Am. Chem. Soc., pp. 7410–7411, vol. 108 (1986).

"Synthesis and Insertion Reactions of Cationic Alkylbis(cyclopentadienyl) titanium Complexes", M. Bochmann, L. M. Wilson, J. Chem. Soc. Commun., pp. 1610–1611, (1986).

Hawley's Condensed Chemical Dictionary, 11th Ed. Van Nostrand Reinhold, New York, 1987, (end sheet).

*Primary Examiner*—Mark Nagumo
*Attorney, Agent, or Firm*—Jim D. Wheelington; M. Norwood Cheairs

[57] ABSTRACT

This invention is for a catalyst system for polymerization of olefins using an ionic metallocene catalyst with aluminum alkyl. The metallocene catalyst is an ion pair formed from a neutral metallocene compound and an ionizing compound. The invention can be used in any method of producing ionic metallocene catalyst. Use of aluminum alkyl with an ionic metallocene catalyst eliminates the need for using methylaluminoxane (MAO). Catalysts produced by the method of this invention have high activity. The invention reduces catalyst poisons which cause low activity, no activity or uncontrolled polymerizations. Polymerizations using this catalyst system are reproducible and controllable.

13 Claims, No Drawings

ADDITION OF ALUMINUM ALKYL FOR IMPROVED METALLOCENE CATALYST

This is a continuation-in-part of application Ser. No. 07/419,222 filed on Oct. 30, 1989, abandoned.

FIELD OF THE INVENTION

This invention relates, in general, to an improved catalyst system and, specifically, to an improved metallocene catalyst system for polymerization of olefins by addition of an aluminum alkyl and a process for using such a catalyst.

DESCRIPTION OF PRIOR ART

Polymerization of olefins is primarily with Zeigler-Natta catalysts. One family of Zeigler-Natta catalyst is Group IVB metallocene compounds with methylaluminoxane as a cocatalyst. It has been demonstrated that a Zeigler-Natta catalyst for olefin polymerization can be formed by combining a Group IVB metallocene with an ionic compound.

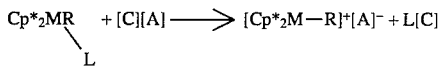

Cp*—cyclopentadienyl or substituted cyclopentadienyl
M—Group IVB metal
R—alkyl
L—ligand
[C]—cation
[A]—anion The resulting compound is a metallocene cation which acts as catalyst. The cation [C] of the ionic compound reacts with the metallocene to generate an ion pair. The anion, [A], is not coordinated or is only loosely coordinated with the cationic metallocene.

The following methods have been used to produce the above reaction:

One-Electron Oxidation—This method is illustrated in "Ethylene Polymerization by a Cationic Dicyclopentadienylzirconium(IV) Alkyl Complex", R. F. Jordan, C. S. Bajgur, R. Willett, B. Scott, J. Am. Chem. Soc., p. 7410–7411, Vol. 108 (1986). These early examples used a Lewis base to make the metal cation less electrophilic and [BPh4]— was the anion where Ph is $C_6H_5$. The reaction occurred in a solvent which was coordinated with the cation. These materials were usually of low activity.

Protonation—This method is illustrated by "Synthesis and Insertion Reactions of Cationic Alkylbis(cyclopentadienyl)titanium Complexes", M. Bochmann, L. M. Wilson, J. Chem. Soc. Commun., p. 1610–1611, (1986); "Cationic Alkylbis(cyclopentadienyl)titanium Complexes", M. Bochmann, L. Wilson, Organometallics, p. 2556–2563, Vol. 6, (1987); Insertion Reactions of Nitriles in Cationic Alkylbis-(cyclopentadienyl)titanium Complexes, M. Bochmann, L. Wilson, organometallics, p. 1147–1154, Vol. 7 (1987).

European Patent Application 0-277-003 relates to work by Turner on a catalyst prepared by a protonation method. A bis(cyclopentadienyl) metal compound is combined with a compound having a cation capable of donating a proton and an anion having a plurality of boron atoms. For example, the following reaction illustrates the invention: bis(pentamethylcyclopentadienyl)zirconium dimethyl+7,8-dicarbaundecaborane —>bis(pentamethylcyclopentadienyl)methyl dodecahydrido -7,8-dicarbaundecabornato zirconium+$CH_4$.

European Patent Application 0-277-004 also relates to work by Turner on a catalyst prepared by a protonation method. A bis(cyclopentadienyl) metal compound is combined with an ionic compound having a cation which will irreversibly react with a ligand on the metal compound and an anion having a plurality of lipophilic radicals around a metal or metalloid ion. For example, the following reaction illustrates the invention: tri(n-butyl)ammonium tetra(pentafluorophenyl)boron+ bis(cyclopentadienyl)zirconium dimethyl—>[$Cp_2ZrMe$][$BPh^*_4$]+$CH_4$+ tri(n-butyl)N wherein Ph* is pentafluorophenyl. A by-product of the protonation reaction is a Lewis base (amine) some of which can coordinate to the cations and thus inhibit catalyst activity. Starting materials must be chosen carefully to avoid generating particular amines which are catalyst poisons.

Carbonium Ion Chemistry—This method is illustrated by "Multiple Metal-Carbon Bonds", R. R. Schrock, P. R. Sharp, J. Am. Chem. Soc., p.2389–2399, Vol. 100, No. 8 (Apr. 2, 1978). A problem with both the carbonium ion chemistry method and the protonation method is that they are poisoned by basic impurities found in olefins and solvents, often resulting in runaway reactions. The high reaction temperature (over 100° C.) and the short duration of the polymerization results in short chain lengths and low molecular weight.

Metallocene catalyst are sensitive to poisons in the absence of a scavenging agent, such as methylaluminoxane. Polymerization requires high concentrations of the cations and frequently end up as either runaway reactions or yield no polymer at all.

SUMMARY OF THE INVENTION

Accordingly, it is an object of this invention to provide a process for improving metallocene catalyst activity in polymerization of olefins.

And, it is an object of this invention to use aluminum alkyl as a scavenging agent for poisons which reduce metallocene catalyst activity.

Also, it is an object of this invention to use aluminum alkyl to improve metallocene catalyst activity of a catalyst made by the protonation, carbonium ion chemistry or one electron oxidation method.

Further, it is an object of this invention to reduce cost of a metallocene catalyst system.

Additionally, it is an object of this invention to eliminate methylaluminoxane (MAO) as a cocatalyst in polymerization of propylene.

As well, it is an object of this invention to produce a metallocene catalyst which affects a controlled polymerization of olefins without a methylaluminoxane cocatalyst.

These and other objects are accomplished by mixing an aluminum alkyl with an olefin, preparing an ionic metallocene catalyst, then mixing the catalyst with the aluminum alkyl-olefin mixture without a methylaluminoxane cocatalyst. The metallocene catalyst is an ion pair formed from a neutral metallocene compound and an ionizing compound of the general formulae:

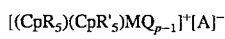

or

wherein $$[R''_n(CpR_4)(CpR'_4)MQ_{p-1}]^+$$

or $$[(CpR_5)(CpR'_5)MQ_{p-1}]^+[A]^-$$

is a metallocene cation is a structural bridge between (CpR$_4$) and (CpR'$_4$) imparting stereorigidity to the metallocene, Cp is cyclopentadienyl R and R' are hydrogen or hydrocarbyl radicals having 1–20 carbon atoms, (CpR$_4$) and (CpR'$_4$) being the same or different, M is a Group IVB metal, Q is a hydrocarbyl radical, each Q being the same or different, p is the valence of M minus 2 and [A]$^-$ is an anion. Q is preferably a hydrocarbyl radical, such as an alkyl, an aryl, an alkenyl, an alkylaryl or an arylalkyl having up to 20 carbon atoms and is most preferably an alkyl or alkoxy of up to six carbon atoms or an aryl or up to 10 carbon atoms. M is preferably zirconium or hafnium. The metallocene cation is preferably a cation of ethylenebis (tetrahydroindenyl)zirconium dimethyl, ethylenebis(idenyl)zirconium dimethyl, ethylenebis(indenyl)hafnium dimethyl and isopropylidene (cyclopentadienyl-1-fluorenyl)zirconium dimethyl and is most preferably ethylenebis(tetrahydroindenyl)zirconium dimethyl. The anion is preferably tetrakis(pentafluorphenyl)borato. The aluminum alkyl is of the general formula AlR*$_3$, wherein R* is a halogen, hydride, alkyl having up to six carbon atoms, alkoxy having up to six carbon atoms or aryl having up to ten carbon atoms, each R* being the same or different but at least one R* is an alkyl and is preferably TMA or TEA1 and is most preferably TEA1.

DESCRIPTION OF THE INVENTION

The invention is for a process of polymerizing olefins without use of a methylaluminoxane cocatalyst and for a catalyst system for use in such a process. An aluminum alkyl is mixed with an olefin and then introduced into the presence of an ionic metallocene catalyst produced by mixing a neutral metallocene compound with an ionic ionizing agent.

In the synthesis procedure for an ionic metallocene catalyst, an ionic ionizing compound is mixed with a neutral metallocene to produce the following reaction:

$$CpR_5)(CpR'_5)MQ_p + [C^*][A^*] \Rightarrow [CpR_5)(CpR'_5)MQ_{p-1}] + [A^*]^- + R[C^*]$$

or $$R''(CpR_4)(CpR'_4)MQ_p + [C^*][A^*] \Rightarrow [R''(CpR_4)(CpR'_4)MQ_{p-1}] + [A^*]^- + R[C^*]$$

where R" is a structural bridge between (CpR$_4$) and (CpR'$_4$) imparting stereorigidity to the metallocene, Cp is cyclopentadienyl, R and R' are hydrogen or hydrocarbyl radicals having 1–20 carbon atoms, M is a Group IVB metal, Q is a hydrocarbyl radical, p is the valence of M minus 2, C* is a cation, A* is an anion and [C*][A*] is an ionic ionizing agent Each (CpR$_4$) and (CpR'$_4$) can be the same or different. Each R and R' can be the same or different. M is preferably zirconium or hafnium. Q is preferably an alkyl, aryl, alkenyl, alkylaryl, or arylalkyl radical of up to 20 carbon atoms and is most preferably methyl R"$_n$(CpR$_4$)(CpR'$_4$)MQ$_p$ is preferably ethylene bis(tetrahydroindenyl)zirconium dimethyl, ethylene bis(indenyl)hafnium dimethyl, ethylene bis(indenyl)zirconium dimethyl or isopropylidene(cyclopentadienyl-1-fluorenyl)zirconium dimethyl and most preferably ethylenebis(indenyl)zirconium dimethyl.

In one example of the new synthesis procedure each reactant is placed in a solvent which is not coordinated or is only loosely coordinated with the metallocene cation, such as methylene chloride or toluene. The preferred solvent is toluene. The ionic ionizing compound is [Ph$_3$C][B(Ph*)$_3$X] where Ph$_3$C is triphenylcarbenium cation and [B(Ph*)$_3$X] is boronato anion where B(Ph*)$_3$ is tris(pentafluorophenyl)boron and X is phenyl or a substituted phenyl where the substituents are alkyl, alkylsilyl or halogen. Examples of the ionic ionizing compound used in this synthesis procedure are triphenylcarbenium tetrakis(pentafluorophenyl) boronate, triphenylcarbenium tris(pentafluorophenyl)(4-trimethylsilyl-2,3,5,6-tetrafluorophenyl)boronate. The ionizing compound does not have an active proton and has an anion which is not coordinated or is only loosely coordinated to the cation of the metallocene.

The neutral metallocene compound and the ionic ionizing compound are dissolved separately in the same solvent and mixed together at room temperature. The ionizing compound ionizes the metallocene and an ion pair is formed in which the metallocene cation acts as a catalyst. This procedure is covered by European Patent Application No. 90870174.1 (publication No. 0426637A2) which is hereby incorporated by reference into this application.

In another example of a synthesis procedure for a catalyst, two components, the first being a neutral metallocene, such as a bis(cyclopentadienyl) metal compound, containing at least one substituent capable of reacting with a proton and the second being an ionic ionizing compound with a cation capable of donating a proton and an anion which is a coordination complex of a plurality of lipophilic radicals and a metal. The anion is bulky, labile and capable of stabilizing the metal cation formed as a result of the reaction between the two compounds. The ionic ionizing compound is [L'H][B Ar$_1$Ar$_2$ X$_3$ X$_4$] where L' is a neutral Lewis base; H is a hydrogen atom; [L'-H] is a Bronsted acid; B is boron in a valance state of 3, Ar$_1$ and Ar$_2$ are the same or different aromatic or substituted-aromatic hydrocarbon radicals containing from about 6 to about 20 carbon atoms and may be linked to each other through a stable bridging group; and X$_3$ and X$_4$ are radicals selected independently, from the group consisting of hydride radicals, halide radicals, with the proviso that only X$_3$ and X$_4$ will be halide at the same time, hydrocarbyl radicals containing from 1 to about 20 carbon atoms, substituted-hydrocarbyl radicals, wherein one or more of the hydrogen atoms is replaced by a halogen atom, containing from 1 to about 20 carbon atoms, hydrocarbyl-substituted metal (organometalloid) radicals wherein hydrocarbyl substitution contains from 1 to about 20 carbon atoms and said metal is selected from Group IV-A of the Period Table of the Elements and the like and wherein [L'H][B Ar$_1$Ar$_2$ X$_3$ X$_4$] is a trialkyl substituted ammonium salt. Examples of this ionic ionizing compound used in this synthesis procedure are triethylammonium tetra(phenyl)boron, tripropylammonium tetra(phenyl)boron, tri(n-butyl)ammonium tetra(phenyl)boron, trimethylammonium tetra(p-tolyl)boron, trimethylammonium tetra(o-tolyl)boron, tributylammonium tetra(pentafluorophenyl)boron, tripropylammonium tetra(o,p-dimethyl-phenyl)boron, tributylammonium tetra(m,m-dimethylphenyl) boron, tributylammonium tetra(p-trifluoromethylphenyl)boron, tributylammonium tetra(pentafluorophenyl)boron, tri(n-butyl)ammonium tetra(o-tolyl)boron and the like: N,N-dialkyl anilinium salts such as N,N-dimethylanilinium tetra(phenyl)boron, N,N-diethylanilinium tetra(phenyl)boron, N,N-2,4, 6-pentamethylanilinium tetra(phenyl)boron and the like: dialkyl ammonium salts such as di-(i-propyl)ammonium tetra(pentafluorophenyl)boron, dicyclohexylammonium tetra(phenyl)boron and the like; and triaryl phosphonium salts such as triphenylphosphonium tetra(phenyl)boron, tri(methylphenyl)phosphonium tetra(phenyl)boron, tri(dimethylphenyl) phosphonium tetra(phenyl)boron and N,N-dimethylanilinium tetrakis(pentafluorophenyl)boron. The ionic compound is preferably N,N-dimethylanilinium tetrakis (pentafluorophenyl) boronate. A proton provided by the cation reacts with a ligand of the metallocene. An active catalyst is recovered as a direct product or decomposition product of the reaction. This is the protonation method described above. The above procedure is covered by European Patent Application Publication No. 0-277-004 which is hereby incorporated by reference into this application.

In another example of a synthesis procedure for a catalyst, a neutral metallocene, such as a cyclopentadienyl metal compound containing a halogen or alkyl coordinated in the metal is combined with a tetraphenylborate metal compound. The halogen or alkyl is abstracted from the metallocene by the metal of the tetraphenylborate metal compound, resulting in an ion pair with a metallocene cation and a tetraphenyl borate anion.

The advantages of the invention are best realized when an aluminum alkyl of the general formula $AlR*^3$ is mixed with an olefin. R* is a halogen, hydride, alkyl having up to six carbon atoms, alkoxy having up to six carbon atoms, or aryl having up to ten carbon atoms, each R* being the same or different but at least one R is an alkyl. Preferably, R* is an alkyl having up to four carbon atoms, Most preferably, R* is triethylaluminum (TEA1) or trimethylaluminum (TMA). The most advantageous aluminum alkyl with the ionic metallocene catalyst evaluated appeared to be TEA1. The olefin is any olefin but preferably propylene or ethylene and most preferably propylene. The mixture of the aluminum alkyl and olefin is brought in contact with an ionic metallocene catalyst, preferably one produced by one of the methods above. After mixing, the catalyst-aluminumalkyl-olefin mixture is brought to conditions to effect polymerization. The polyolefin is then extracted.

The following metallocene-ionizing agent systems were evaluated with and without addition of an aluminum alkyl:
1. $Et(Ind)_2ZrMe_2/[Ph_3C][BPh*_4]$
2. $Et(Ind)_2HfMe_2/[Ph_3C][BPh*_4]$
3. $Et(Ind)_2ZrMe_2/[Me_2PhNH][BPh*_4]$
4. $iPr(Cp-1-Flu)ZrMe_2/[Ph_3C][BPh*_4]$
5. $Et(H_4Ind)_2ZrMe_2/[Ph_3C][BPh*_4]$
6. $Et(H_4Ind)_2ZrMe_2/[Me_2PhNH][BPh*_4]$ $Et(Ind)_2ZrMe_2$ is ethylene bis (indenyl) zirconium dimethyl, $iPr(Cp-1-Flu)ZrMe_2$ is isopropylidene (cyclypentadienyl-1-fluorenyl) zirconium dimethyl, $Et(H_4Ind)_2ZrMe_2$ is ethylene bis (tetradroindenyl) zirconium dimethyl, $[Ph_3C][BPh*_4]$ is triphenylcarbenium tetrakis(pentafluorophenyl)boronate, $[Me_2PhNH][BPh*_4]$ is N,N-dimethylanilinium tetrakis(pentafluorphenyl)boronate.

The invention having been generally described, the following examples are given as particular embodiments of the invention and to demonstrate the practice and advantages thereof. It is understood that the examples are given by way of illustration and are not intended to limit the specification or the claims to follow in any manner.

GROUP 1

Example I 100 mg of $[Ph_3C][BPh*_4]$ was dissolved in 10 ml of toluene. 60 mg of $Et(Ind)_2ZrMe_2$ was dissolved in 10 ml of toluene. The two solutions were mixed together for 5 minutes at room temperature.

Reactor temperature was set to 50° C. and one liter of propylene was pumped into the reactor. The catalyst mixture was added to a 40 ml stainless steel bomb equipped with ball valves on each end. 400 ml of propylene was pumped through the bomb into the reactor. The reactor temperature remained at 50° C. and the contents of the reactor were agitated for sixty minutes. At the end of the polymerization, the reactor is cooled and the unreacted propylene was vented from the reactor.

The reaction product was dried under vacuum at approximately 40° C. for 12 hours. The polymer was then weighed and analyzed for melting point. The melting point was derived from differential scanning calorimetry (DSC). The results are shown in Table I.

Example II

The procedure of Example I was repeated with the contents of the reactor being agitated for 30 minutes. The results are shown in Table I.

Example III

The procedure of Example I was repeated with the contents of the reactor set point temperature being set at 70° C. The results are shown in Table I.

Example IV 0.32 mmol of trimethylaluminum (TMA) was dissolved in 5 ml of toluene and was added to a 2 liter Zipperclave reactor under 5 psig of nitrogen. Reactor temperature was set to 70° C. and one liter or propylene was pumped into the reactor. The mixture was stirred for ten minutes at 1200 rpm.

100 mg of $[Ph_3C][BPh*_4]$ was dissolved in 10 ml of toluene. to mg of $Et(Ind)_2ZrMe_2$ was dissolved in 10 ml of toluene. The two solutions were mixed together for 5 minutes at room temperature.

The catalyst mixture was added to a 40 ml stainless steel bomb equipped with ball valves on each end. 400 ml of propylene was pumped through the bomb into the reactor. The reactor temperature remained at 70° C. and the contents of the reactor were agitated for sixty minutes. At the end of the polymerization, the reactor is cooled and the unreacted propylene was vented from the reactor.

The reaction product was dried under vacuum at approximately 40° C. for 12 hours. The polymer was then weighed and analyzed for melting point. The melting point was derived from differential scanning calorimetry (DSC). The results are shown in Table I.

Example V

The procedure of Example II was repeated using 0.33 mmol of triethylaluminum (TEA1) and agitating the contents of the reactor for 10 minutes. The results are shown in Table I.

Example VI

The procedure of Example II was repeated using 0.33 mmol of triethylaluminum (TEA1), 50 mg of $[Ph_3C][BPh*_4]$ and 30 mg of $Et(Ind)_2ZrMe_2$. The contents of the reactor were agitated for 5 minutes. The results are shown in Table I.

Example VII

The procedure of Example II was repeated using 0.33 mmol of triethylaluminum (TEA1), 16 mg of [Ph$_3$C][BPh*$_4$] and 10 mg of Et(Ind)$_2$ZrMe$_2$. The contents of the reactor were agitated for ten minutes. The results are shown in Table I.

Example VIII

The procedure of Example II was repeated using 0.66 mmol of triethylaluminum (TEA1), 8 mg of [Ph$_3$C][BPh*$_4$] and 2.5 mg of Et(Ind)$_2$ZrMe$_2$. The contents of the reactor were agitated for sixty minutes. The results are shown in Table I.

Example IX

The procedure of Example II was repeated using 0.66 mmol of triethylaluminum (TEA1), 8 mg of [Ph$_3$C][BPh*$_4$] and 1.25 mg of Et(Ind)$_2$ZrMe$_2$. The contents of the reactor were agitated for sixty minutes. The results are shown in Table I.

Example X

The procedure of Example II was repeated using 0.66 mmol of triethylaluminum (TEA1), 8 mg of [Ph$_3$C][BPh*$_4$] and 2.5 mg of Et(Ind)$_2$ZrMe$_2$. The contents of the reactor were agitated for thirty minutes. The results are shown in Table I.

Example XI

The procedure of Example II was repeated using 0.66 mmol of triethylaluminum (TEA1), 8 mg of [Ph$_3$C][BPh*$_4$] and 2.5 mg of Et(Ind)$_2$ZrMe$_2$. The contents of the reactor were agitated for forty minutes. The results are shown in Table I.

Example XII

The procedure of Example II was repeated using 0.33 mmol of triethylaluminum (TEA1), 8 mg of [Ph$_3$C][BPh*$_4$] and 5 mg of Et(Ind)$_2$ZrMe$_2$. The contents of the reactor were agitated for thirty minutes. The results are shown in Table I.

Example XIII

The procedure of Example II was repeated with 5 mg of Et(Ind)$_2$ZrMe$_2$, 8 mg of [Ph$_3$C][BPh*$_4$], 0.66 mmol of triethylaluminum and a run time of 30 minutes. The results are shown in Table I.

Example XIV

The procedure of Example II was repeated with 2.5 mg of Et(Ind)$_2$ZrMe$_2$, 8 mg of [Ph$_3$C][BPh*$_4$]. 0.66 mmol of triethylaluminum and a run time of 60 minutes. The results are shown in Table I.

Example XV

The procedure of Example II was repeated with 2.5 mg of Et(Ind)$_2$ZrMe$_2$, 4 mg of [Ph$_3$C][BPh*$_4$], 0.66 mmol of TEA1 and a run time of 30 minutes. The results are shown in Table I.

Example XVI

The procedure of Example II was repeated with 2.5 mg of Et(Ind)$_2$ZrMe$_2$, 4 mg of [Ph$_3$C][BPh*$_4$], 0.99 mmol of TEA1 and a run time of 30 minutes. The results are shown in Table I.

Example XVII

The procedure of Example II was repeated with 2.5 mg of Et(Ind)$_2$ZrMe$_2$, 24 mg of [Ph$_3$C][BPh*$_4$], 0.66 mmol of TEA1 and a run time of 30 minutes. The results are shown in Table I.

Example XVIII

The procedure of Example II was repeated with 2.5 mg of Et(Ind)$_2$ZrMe$_2$, 24 mg of [Ph$_3$C][BPh*$_4$], 2.00 mmol of TEA1 and a run time of 30 minutes. The results are shown in Table I.

GROUP 2

Example XIX

The procedure of Example II was repeated with 20 mg of Et(Ind)$_2$ZrMe$_2$, 80 mg of [Ph$_3$C][BPh*$_4$], 0.42 mmol of trimethylaluminum and a run time of 30 minutes. The results are shown in Table I.

GROUP 3

Example XX

The procedure of Example I was repeated with 2.5 mg of Et(Ind)$_2$ZrMe$_2$, 7 mg of [Me$_2$PhNH][BPh*$_4$], and a run time of 60 minutes. The results are shown in Table I.

Example XXI

The procedure of Example II was repeated with 2.5 mg of Et(Ind)$_2$ZrMe$_2$, 7.0 mg of [Me$_2$PhNH][BPh*$_4$], 0.66 mmol triethylaluminum and a run time of 60 minutes. The results are shown in Table I.

Example XXII

The procedure of Example II was repeated with 0.66 mmol of triethylaluminum (TEA1), 7.0 mg of [Me$_2$PhNH][BPh*$_4$], and 2.5 mg of Et(Ind)$_2$ZrMe$_2$. The contents of the reactor were agitated for 25 minutes. The results are shown in Table I.

Example XXIII

The procedure of Example II was repeated using 0.66 mmol of triethylaluminum (TEA1), 3.5 mg of [Me$_2$PhNH][BPh*$_4$] and 1.25 mg of Et(Ind)$_2$ZrMe$_2$. The contents of the reactor were agitated for 30 minutes. The results are shown in Table I.

Example XXIV

The procedure of Example II was repeated with 1.25 mg of Et(Ind)$_2$ZrMe$_2$, 3.5 mg of [Me$_2$PhNH][BPh*$_4$]2, 0.66 mmol of triethylaluminum and a run time of 60 minutes. The results are shown in Table I.

Example XXV

The procedure of Example II was repeated with 0.625 mg of Et(Ind)$_2$ZrMe$_2$, 1.75 mg of [Me$_2$PhNH][BPh*$_4$], 0.66 mmol of triethylaluminum and a run time of 60 minutes. The results are shown in Table I.

GROUP 4

Example XXVI

The procedure of Example I was repeated with 60 mg of iPr(Cp- 1-Flu)ZrMe$_2$, 100 mg of [Ph$_3$C][BPh*$_4$], and a run time of 60 minutes. The results are shown in Table I.

Example XXVIII

The procedure of Example II was repeated with 60 mg of iPr(Cp- 1-Flu)ZrMe$_2$, 100 mg of [Ph$_3$C][BPh*$_4$], 0.16 mmol of trimethylaluminum and a run time of 60 minutes. The results are shown in Table I.

Example XXIX

The procedure of Example II was repeated using 0.48 mmol of trimethylaluminum (TMA), 100 mg of [Ph$_3$C][BPh*$_4$] and 60 mg of iPr(Cp-1-Flu)ZrMe$_2$, and a run time of 60 minutes. The results are shown in Table I.

Example XXX

The procedure of Example II was repeated with 20 mg of iPr(Cp- 1-Flu)ZrMe$_2$, 60 mg of [Ph$_3$C][BPh*$_4$], 0.16 mmol of trimethylaluminum and a run time of 60 minutes. The results are shown in Table I.

GROUP 5

Example XXXI

The procedure of Example I was repeated with 15 mg of Et(H$_4$Ind)$_2$ZrMe$_2$, 30 mg of [Ph$_3$C][BPh*$_4$], and a run time of 60 minutes. The results are shown in Table I.

Example XXXII

The procedure of Example I was repeated with 20 mg of Et(H$_4$Ind)$_2$ZrMe$_2$, 40 mg of [Ph$_3$C][BPh*$_4$], and a run time of 60 minutes. The results are shown in Table I.

Example XXXIII

The procedure of Example I was repeated with 20 mg of Et(H$_4$Ind)$_2$ZrMe$_2$, 40 mg of [Ph$_3$C][BPh*$_4$], and a run time of 5 minutes. The results are shown in Table I.

Example XXXIV

The procedure of Example II was repeated with 2.5 mg of Et(H$_4$Ind)$_2$ZrMe$_2$, 8 mg of [Ph$_3$C][BPh*$_4$], 0.66 mmol of TEA1 and a run time of 60 minutes. The results are shown in Table I.

GROUP 6

Example XXXV

The procedure of Example I was repeated with 50 mg of Et(H$_4$Ind)$_2$ZrMe$_2$, 40 mg of [Me$_2$PhNH][BPh*$_4$], and a run time of 120 minutes. The results are shown in Table I.

Example XXVI

The procedure of Example II was repeated with 2.5 mg of Et(H$_4$Ind)$_2$ZrMe$_2$, 9.2 mg of [Me$_2$PhNH][BPh*$_4$], 0.66 mmol of TEA1 and a run time of 60 minutes. The results are shown in Table I. The following results are from the experimental runs described above using the method of the present invention.

TABLE I

| Run # | Metallocene umol (mg) | Ionizing Agent umol (mg) | Al-alkyl mmol | Ratio | Run Time min. | Polymerization temp (°C.) | Yield (gms) | Melting Temp (°C.) |
|---|---|---|---|---|---|---|---|---|
|  | Et(Ind)$_2$ZrMe$_2$ | [Ph$_3$C][BPh*$_4$] |  |  |  |  |  |  |
| 1 | 159(60) | 109(100) | 0 | — | 60 | 50 | 19 | 137 |
| 2 | 159(60) | 109(100) | 0 | — | 30 | 50 | 11 | 125 |
| 3 | 159(60) | 109(100) | 0 | — | 60 | 70 | 8 | 126 |
| 4 | 159(60) | 109(100) TMA | 0.32 | 1.5:1:2.9 | 60 | 70 | 270 | 124 |
| 5 | 159(60) | 109(100) TEA1 | 0.33 | 1.5:1:3.0 | 10 | 70* | 340 | 126 |
| 6 | 80(30) | 54(50) | 0.33 | 1.5:1:6.1 | 5 | 70* | 432 | No Melt |
| 7 | 26.5(10) | 17.3(16) | 0.33 | 1.5:1:19.1 | 10 | 70* | 260 | 118 |
| 8 | 6.63(2.5) | 8.64(8) | 0.66 | 0.77:1:76.4 | 60 | 70 | 319 | 129 |
| 9 | 3.36(1.25) | 8.64(8) | 0.66 | 0.4:1:76.4 | 60 | 70 | 89 | 132 |
| 10 | 6.63(2.5) | 8.64(8) | 0.66 | 0.77:1:76.4 | 30 | 70 | 117 |  |
| 11 | 6.63(2.5) | 8.64(8) | 0.66 | 0.77:1:76.4 | 40 | 70* | 377 | 131 |
| 12 | 13.3(5) | 8.6(8) | 0.33 | 1.5:1:38.4 | 30 | 70 | 22 | 132 |
| 13 | 13.3(5) | 8.64(8) | 0.66 | 1.5:1:76.4 | 30 | 70 | 51 | 131 |
| 14 | 6.63(2.5) | 8.64(8) | 0.66 | 0.77:1:76.4 | 60 | 70* | 357 | 127 |
| 15 | 6.63(2.5) | 4.3(4) | 0.66 | 1.5:1:153.5 | 30 | 70 | 9 | 132 |
| 16 | 6.63(2.5) | 4.3(4) | 0.99 | 1.5:1:230.2 | 30 | 70 | 11 | 134 |
| 17 | 6.63(2.5) | 26(24) | 0.66 | 0.255:1:25.4 | 30 | 70 | 149 | 131 |
| 18 | 6.63(2.5) | 26(24) | 2.00 | 0.255:1:76.9 | 30 | 70 | 62 | 130 |
|  | Et(Ind)$_2$HfMe$_2$ | [Ph$_3$C][BPh*$_4$] |  |  |  |  |  |  |
| 19 | 53(20) | 85(80) TMA | 0.42 | 0.62:1:4.9 | 30 | 70 | 51 | 131 |

TABLE I-continued

| Run # | Metallocene umol (mg) | Ionizing Agent umol (mg) | Al-alkyl mmol | Ratio | Run Time min. | Polymerization temp (°C.) | Yield (gms) | Melting Temp (°C.) |
|---|---|---|---|---|---|---|---|---|
| | Et(Ind)$_2$ZrMe$_2$ | [Me$_2$PhNH][BPh*$_4$] | | | | | | |
| 20 | 6.6(2.5) | 8.7(7.0) | 0 | — | 60 | 70 | — | — |
| 21 | 6.6(2.5) | 8.7(7.0) TEA1 | 0.66 | 0.76:1:75.9 | 5 | 70* | 106 | 125 |
| 22 | 6.6(2.5) | 8.7(7.0) | 0.66 | 0.76:1:75.9 | 25 | 70* | 405 | 127 |
| 23 | 3.3(1.25) | 4.35(3.5) | 0.66 | 0.76:1:151.7 | 30 | 70* | 434 | 127 |
| 24 | 3.3(1.25) | 4.35(3.5) | 0.66 | 0.76:1:151.7 | 60 | 70 | 385 | 131 |
| 25 | 1.65(.0625) | 2.175(1.75) | 0.66 | 0.76:1:303.4 | 60 | 70 | 253 | 131 |
| | iPr(Cp-1-Flu)ZrMe$_2$ | [Ph$_3$C][BPh*$_4$] | | | | | | |
| 26 | 102(40) | 65(60) | 0 | — | 60 | 80 | 2 | — |
| 27 | 154(60) | 109(100) | 0 | — | 60 | 70 | 51 | — |
| 28 | 154(60) | 109(100) TMA | 0.16 | 1.5:1:1.5 | 60 | 70* | 284 | 116 |
| 29 | 154(60) | 109(100) | 0.48 | 1.5:1:4.4 | 60 | 70* | 268 | 117 |
| 30 | 51(20) | 65(60) | 0.16 | 1.78:1:2.5 | 60 | 70* | 156 | 116 |
| | Et(H$_4$Ind)$_2$ZrMe$_2$ | [Ph$_3$C][BPh$_4$] | | | | | | |
| 31 | 40(15 | 33(30) | 0 | — | 60 | 50 | 2 | 142 |
| 32 | 53(20) | 44(40) | 0 | — | 60 | 50 | 35 | 138 |
| 33 | 80(30) | 67(60) | 0 | — | 5 | 120 | 70 | 127 |
| 34 | 7(2.5) | 8.8(8.0)TEA1 | 0.66 | 0.8:1:75 | 60 | 70 | 154 | 115 |
| | Et(H$_4$Ind)$_2$ZrMe$_2$ | [Me$_2$PhNH][BPh$_4$] | | | | | | |
| 35 | 133(50) | 44(40) | 0 | — | 120 | 50 | 50 | 133 |
| 36 | 7(2.5) | 10(9.2) TEA1 | 0.66 | 0.7:1:66 | 60 | 70 | 116 | 116 |

*Exotherm; reaction temperature increased by more than 10° C.

Molar ratios for metallocene:ionizing compound:aluminum alkyl range from about 0.25:1:2.5 to about 1.5:1:300 and are preferably from about 0.25:1:25 to about 1.5:1:230 and are most preferably about 0.76:1:150.

The process described by this invention synthesizes cations which are used as catalysts in olefin polymerization. The process of making catalysts with this invention produces catalysts having high activity and reduces the by-products which can inhibit catalyst activity. This new synthesis also reduces the catalyst poisons found in the solvents which can inhibit catalyst activity.

The addition of an aluminum alkyl to ionic metallocene catalyst systems was found to result in reproducible, controllable, high efficiency polymerizations. The addition of an alkyl aluminum provides a scavenging agent for catalyst poisons. The quantity of aluminum alkyl added is relatively small and aluminum alkyls are relatively inexpensive. The metallocene cation/aluminum alkyl combination results in a better catalyst system than the cations alone and give consistently high activities.

Obviously, numerous modifications and variations of the present invention are possible in light of the above teachings. It is therefore to be understood that within the scope of the appended claims, the invention may be practiced otherwise than as specifically described herein.

What is claimed and desired to be secured by Letter of patent of the United States of America is:

1. A process for polymerization of olefins comprising:
   a) mixing an aluminum alkyl with an olefin;
   b) preparing a metallocene catalyst;
   c) mixing the catalyst with the aluminum alkyl-olefin mixture;
   d) maintaining the catalyst-aluminum alkyl-olefin mixture under conditions to effect liquid phase polymerization, and
   e) extracting polyolefin,
   wherein the metallocene catalyst is an ion pair formed from a neutral metallocene compound and an ionic ionizing compound;
   wherein the neutral metallocene is of the general formulae:

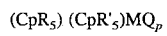

or

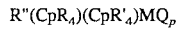

wherein Cp is a cyclopentadienyl group, (CpR$_4$) and (CpR'$_4$) being the same or different, R and R' is hydrogen or a hydrocarbyl radical, R being the same or different, R' being the same or different R" is a structural bridge between (CpR$_4$) and (C$_p$R'$_4$) imparting stereorigidity to the metallocene, M is a Group IVB metal, Q is a hydrocarbyl radical, p is the valence of M minus 2;
   wherein the aluminum alkyl is of the general formula AlR*$_3$ where R* is a halogen, hydride, alkyl having up to six carbon atoms, alkoxy having up to six carbon atoms or aryl having up to ten carbon atoms, each R* being the same or different and at least one R* is an alkyl;
   wherein the molar ratio for neutral metallocene compound: ionic ionizing compound: aluminum alkyl ranges from about 0.25:1:2.5 to about 1.5:1:300; and
   wherein the ionic ionizing compound is of the general formula:
   a) [Ph$_3$C][B(Ph*)$_3$X] where Ph$_3$C is triphenylcarbenium cation and [B(Ph*)$_3$X] is boronato anion where B(Ph*)$_3$ is tris(pentafluorophenyl)boron and X is phenyl or a substituted phenyl where the substituents are alkyl, alkylsilyl or halogen.

2. A process as recited in claim 1 wherein the molar ratio for neutral metallocene compound: ionizing compound: aluminum alkyl ranges from about 0.25:1:25 to about 1.5:1:230.

3. A process as recited in claim 2 wherein the molar ratio for neutral metallocene: compound ionizing compound: aluminum alkyl is about 0.76:1:150.

4. A process as recited in claim 1 wherein R* is an alkyl having up to four carbon atoms.

5. A process as recited in claim 4 wherein the aluminum alkyl is selected from the group consisting of triethylaluminum and trimethylaluminum.

6. A process as recited in claim 5 wherein the aluminum alkyl is triethylaluminum.

7. A process as recited in claim 1 wherein the olefin is propylene.

8. A process as recited in claim 1 wherein R and R' are hydrocarbyl radicals having up to 20 carbon atoms selected from the group consisting of an alkyl, an aryl, an alkenyl, an alkylaryl and an arylalkyl.

9. A process as recited in claim 1 wherein the M is hafnium or zirconium.

10. A process as recited in claim 1 wherein the neutral metallocene is chosen from the group consisting of ethylenebis (tetrahydroindenyl) zirconium dimethyl, ethylenebis(indenyl) zirconium dimethyl, ethylene bis(indenyl)hafnium dimethyl and isopropylidene (cyclopentadienyl-1-fluorenyl)zirconium dimethyl.

11. A process as recited in claim 1 wherein X is phenyl, pentafluorophenyl or 4-trimethylsilyl-2,3,5,6 tetrafluorophenyl.

12. A process as recited in claim 11 wherein the ionic ionizing compound is triphenylcarbenium tetrakis(pentafluorophenyl) boronate or triphenylcarbenium tris(pentafluorophenyl) (4-trimethylsilyl-2,3,5,6-tetrafluorophenyl) boronate.

13. A process as recited in claim 12 wherein the ionic ionizing compound is triphenylcarbenium tetrakis(pentafluorophenyl) boronate.

* * * * *